United States Patent [19]

Mead et al.

[11] 4,383,400
[45] May 17, 1983

[54] METHOD AND APPARATUS FOR POSITIONING GRAPEVINE SHOOTS

[76] Inventors: Lewis S. Mead, 1896 King Rd.; James K. Merritt, Rte. 39, both of Forestville, N.Y. 14062

[21] Appl. No.: 218,197

[22] Filed: Dec. 19, 1980

[51] Int. Cl.³ .......................................... A01D 55/18
[52] U.S. Cl. .................................. 56/233; 56/12.7; 56/15.5; 56/330
[58] Field of Search ................. 56/233, 234, 235, 237, 56/330, 12.7, DIG. 2, 15.5; 47/1

[56] References Cited

U.S. PATENT DOCUMENTS

| | | | |
|---|---|---|---|
| 3,255,578 | 6/1966 | Pertics | 56/330 |
| 3,513,650 | 5/1970 | Porter | 56/234 |
| 3,606,741 | 9/1971 | Olmo et al. | 56/330 |
| 3,760,574 | 9/1973 | Tassone | 56/330 |
| 4,206,585 | 6/1980 | Pollock | 56/330 |
| 4,257,213 | 3/1981 | Brumat | 56/12.7 |

FOREIGN PATENT DOCUMENTS 2377761 9/1978 France .................. 56/233

*Primary Examiner*—Jay N. Eskovitz
*Attorney, Agent, or Firm*—Charles L. Lovercheck; Wayne L. Lovercheck; Dale R. Lovercheck

[57] ABSTRACT

A brushing machine for grapevines is disclosed made up of rotating brushes supported on a frame that is supported on a tractor. Each brushing mechanism has several brushes with radially extending bristles rotatably supported on a vertically and horizontally adjustable frame. The brushes are individually driven and pass along both sides of a grape trellis. The frame supporting the axles of the brushes may be swung to adjust the angle of the brushes to the ground for any particular tractor speed, so that as the tractor moves forward and the brushes rotate, the resultant motion relative to the trellis of the tips of the brush straws is in a vertical direction.

13 Claims, 7 Drawing Figures

METHOD AND APPARATUS FOR POSITIONING GRAPEVINE SHOOTS

GENERAL DESCRIPTION OF THE INVENTION

The brushing machine or shoot positioner is fixed to a tractor on a positioner and has four to six overlapping synthetic bristle brushes which rotate through the grape trellis positioning the shoots of the grapevines. The shoot positioner is mounted on a conventional farm tractor which can be used for other purposes throughout the year. This machine can also be used for trimming grapevine shoots and the manipulation of new growth in other trees and plants.

The machine and process descried herein increases yields—better wood maturity promotes and facilitates higher yield in the next and succeeding crop years. Riper grapes—because of more exposure to sunlight. Reduces pruning costs, greatly reduces hand pruning costs and enhances mechanical operations, including pruning.

OBJECTS OF THE INVENTION

It is an object of the invention to provide a grapevine brushing machine.

Another object of the invention is to provide a grapevine shoot positioning machine.

Another object is to provide a grapevine trimming machine.

Another object of the invention is to provide a method of leaf and fruit removal and positioning on other trees and plants.

Another object of the invention is to provide a shoot positioner that is simple in construction, economical to manufacture and simple and efficient to use.

With the above and other objects in view, the present invention consists of the combination and arrangement of parts hereinafter more fully described and illustrated in the accompanying drawing and more particularly pointed out in the appended claims, it being understood that changes may be made in the form, size, proportions and minor detals of construction without departing from the spirit or sacrificing any of the advantages of the invention.

GENERAL DESCRIPTION OF THE DRAWINGS

DETAILED DESCRIPTION OF THE DRAWINGS

Figure 1:
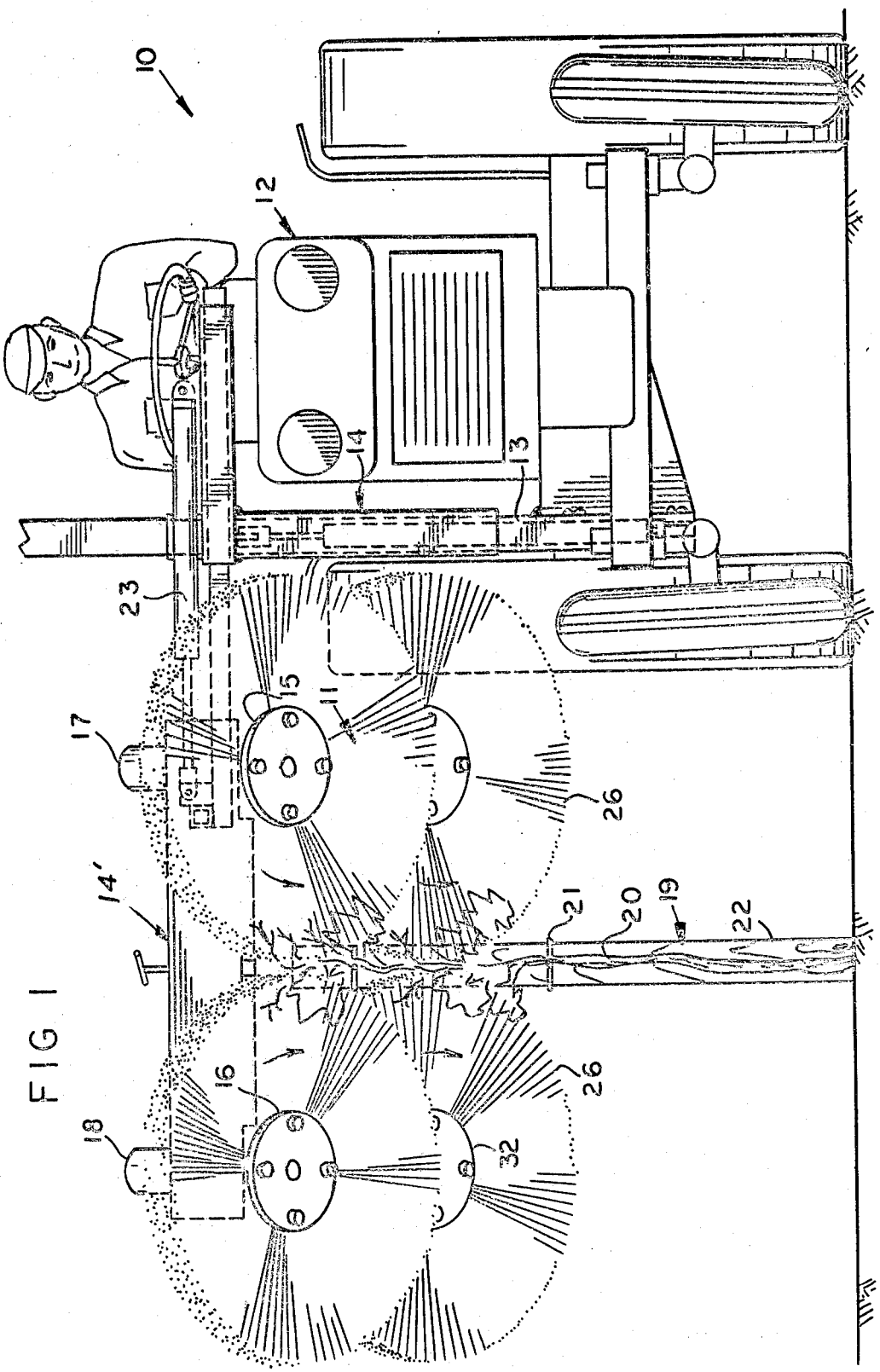
FIG. 1 is a front view of one embodiment of the shoot positioning machine supported on a tractor according to the invention.
Figure 2:
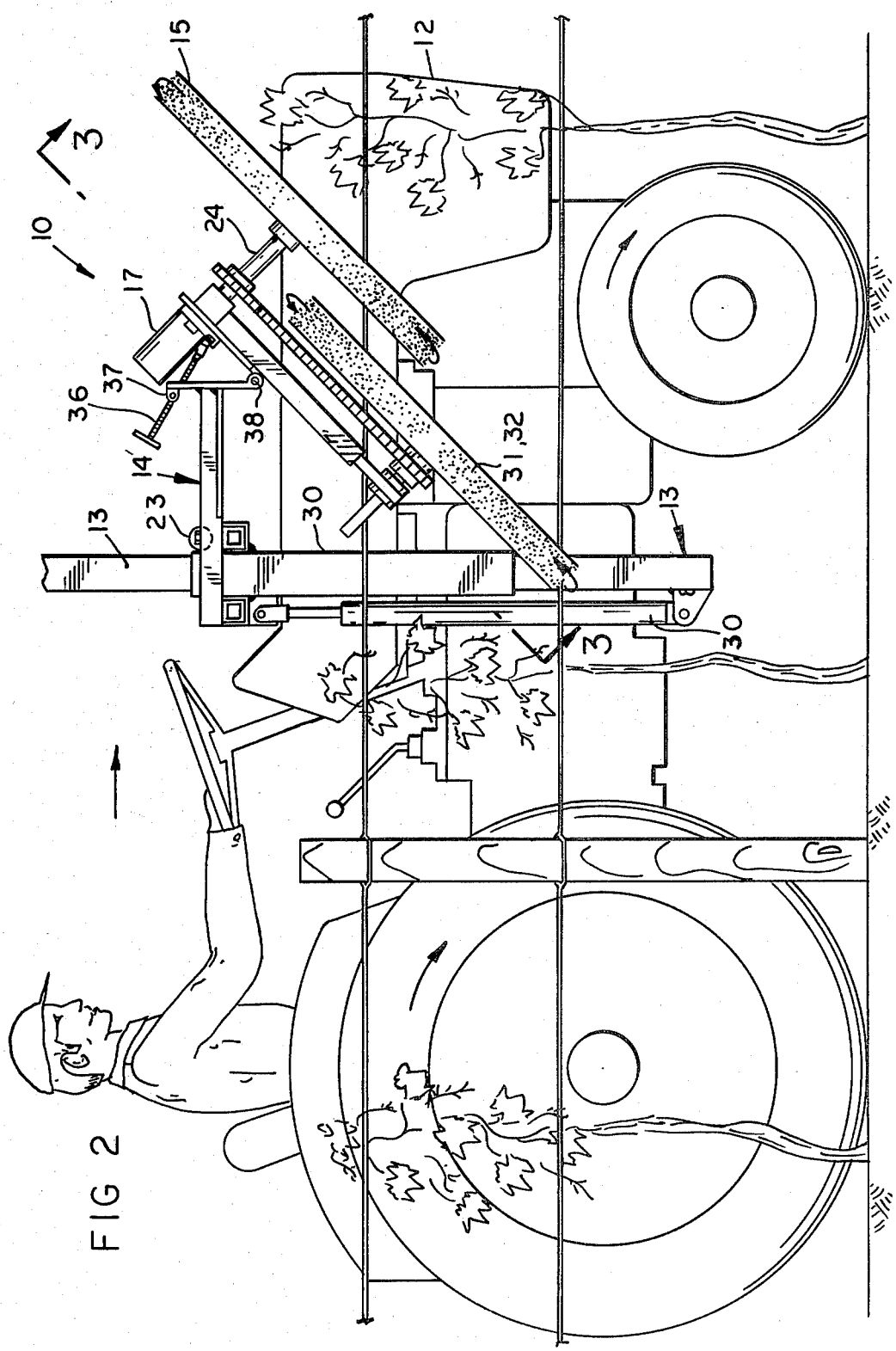
FIG. 2 is a side view of the machine shown in FIG. 1.
Figure 3:
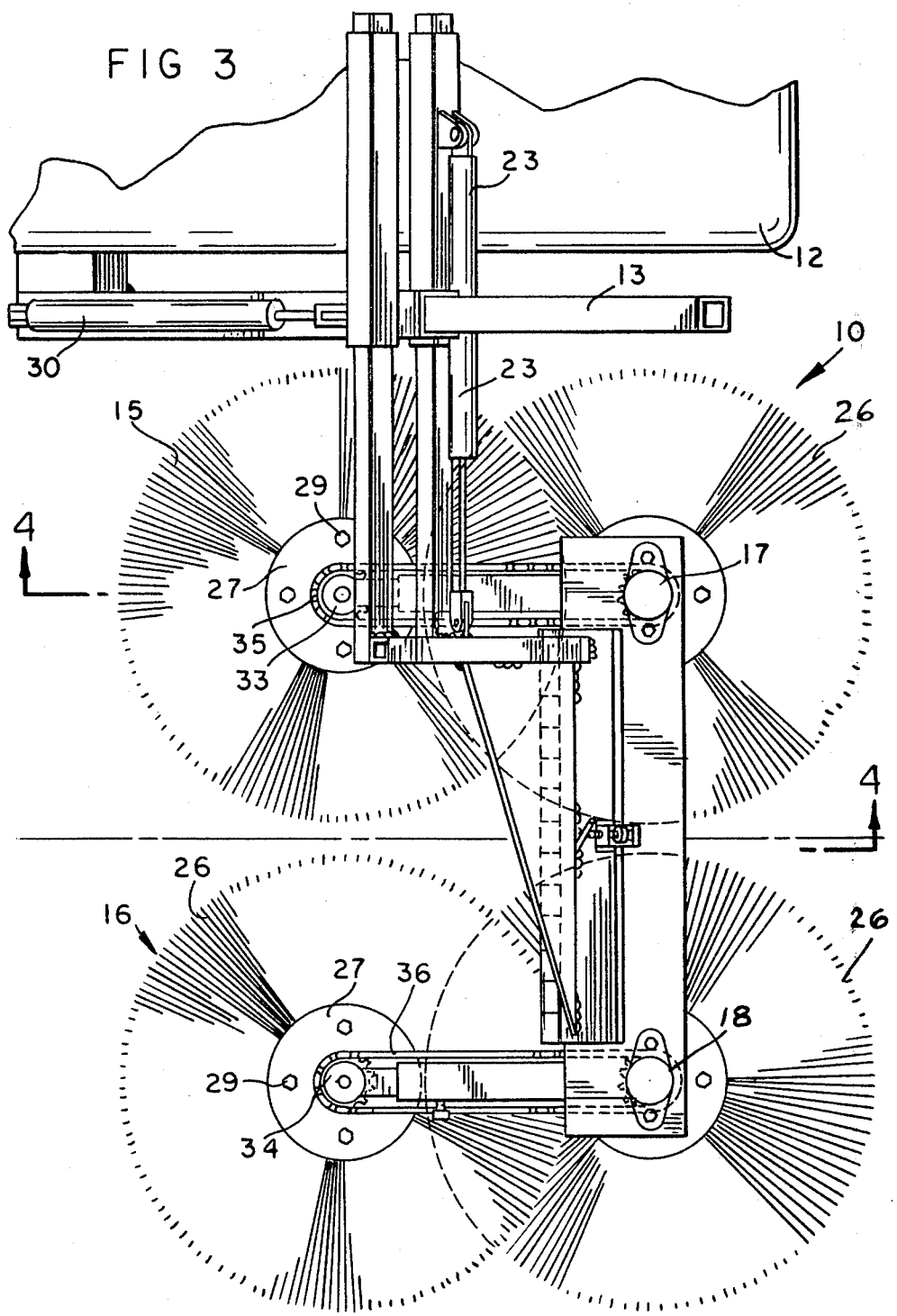
FIG. 3 is a rear view of the shoot positioning machine shown in FIGS. 1 and 2.
Figure 4:
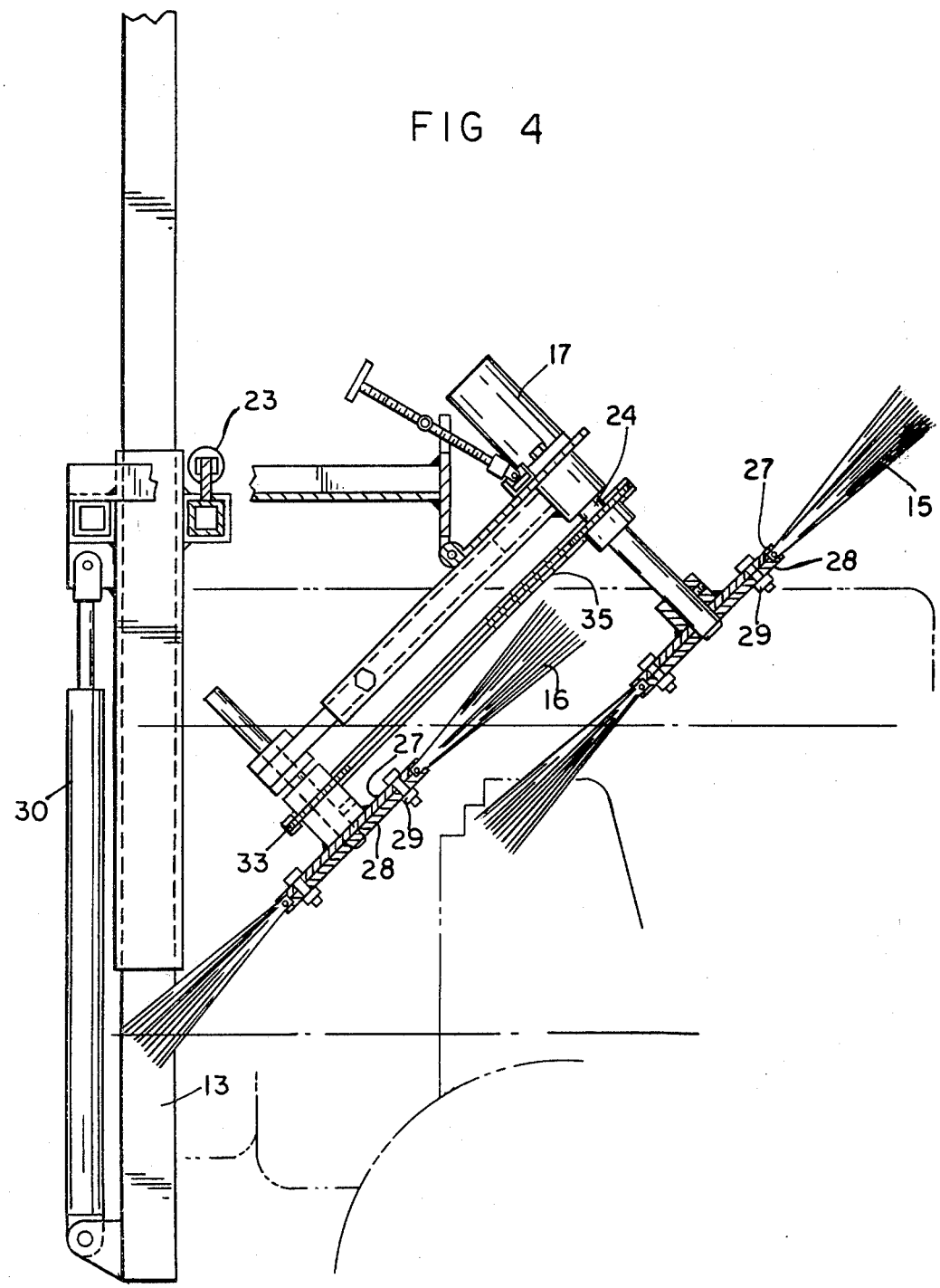
FIG. 4 is an enlarged side view of the machine shown in FIGS. 1, 2 and 3, of a cross section taken on Line 4—4 of FIG. 3.

Now, with more particular reference to the drawings, the shoot positioning machine indicated generally at 10 comprises a brushing arrangement 11 adapted to be mounted on a farm tractor 12. The brushing arrangement 11 is shown mounted on the side of the tractor slightly rearward from the front; however, the machine can be mounted on the front of the tractor and is advantageously mounted in that matter. The arrangement could even be mounted on the rear of the tractor if desired.

The machine generally comprises a mounting frame vertically and slidably supported on the vertical column 13 shown supported on the tractor 12 on the side. It could be mounted at the front of the tractor, on the side or otherwise. The brush carrier frame 14 is laterally slidable on a first frame shown supported on two square section members that are telescopically supported on each other.

The first circular brush 15 is supported on the first side of the brush carrier and the second circular brush 16 is supported on the second side of the brush carrier frame and motors 17 and 18 are supported on the frame and connected to each circular brush rotating the brush in a plane inclined apporoximately 45° to the horizontal, but it can be adjusted by means of the handle 36 that is threadably received in the nut 37 and swings the frame above the pivot axis 38 that extends generally perpendicular to the shafts 24. The brushes 15 and 16 are supported in horizontal spaced relation to each other so that the grape trellis 19 can pass through the space between them.

The trellis is shown made up of the vines 20 supported on wire 21, which are in turn supported on posts 22. The brush carrier frame 14' has the horizontal cylinder 23 connected to the vertical column and to the brush supporting frame so that the brush carrier frame 14' can be slid along the horizontal frame member attached to the vertical column. The motor shaft 24 and 25 extend downwardly and forwardly at an angle of approximately 45°, which can be adjusted. The circular brushes have relatively long synthetic straws 26, and the straws of the upper brushes 15 and 16 overlap the straws of the intermediate circular brushes 31 and 32.

The speed of brush rotation in combination with the angle adjustment of the brush to the vertical as it relates to the forward travel speed of the carrier vehicle (tractor) results in a resultant vertical movement of the parts of the plant engaged by the brush.

The brushing machine can be used for foliage trimming or removal by reversing the angle of attack and reversing the brush direction of rotation.

Additional brushes 41 and 42 can be supported below the intermediate circular brushes 31 and 32 to brush the low hanging vines.

The circular brushes are each made up of a first plate 27 and a second plate 28 with the straws sandwiched between them and bolts 29 extending through these plates clamping the straws between the plates.

The vertical column has a vertical cylinder 30 by which the entire brushing arrangement can be adjusted up and down. The third circular brush 31 and fourth circular brush 32 may be driven by means of a sprocket and chain arrangement as indicated in the drawing. The motors 17 driving the brushes 15, 16, 31, 32, 41 and 42 may be hydraulic motors driven from the hydraulic system of the tractor, or by an independent hydraulic system.

The brushes may be arranged so that the lower brushes are further from each other than the intermediate brushes or the upper brushes as shown in FIG. 1, or they can be arranged at the same distance from each other as shown in FIG. 1.

Figure 5:
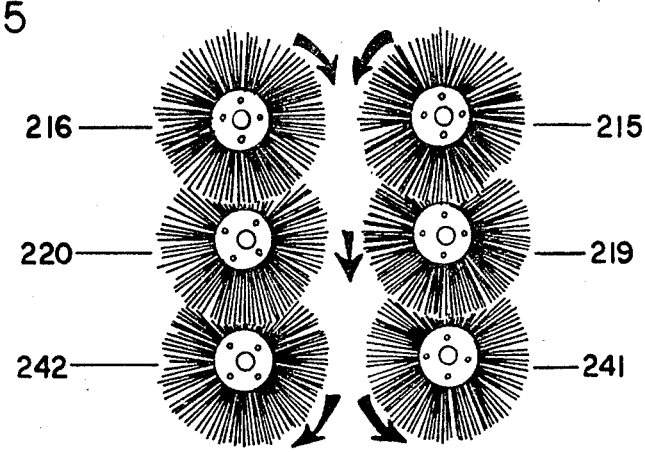
FIG. 5 is a partial front view of the machine according to the invention having six brushes with axes in vertical lines.
Figure 6:
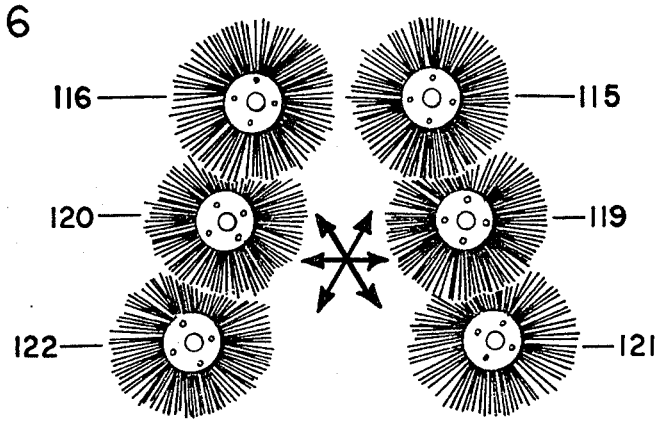
FIG. 6 is a partial view of the machine having six brushes with axes on converging lines.
Figure 7:
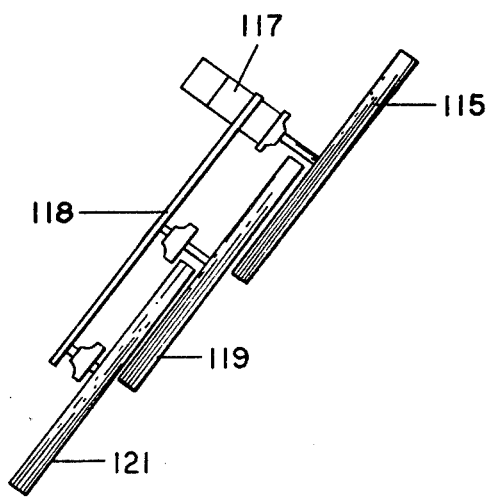
FIG. 7 is a partial side view of the six brush machines.

In the machine shown in FIGS. 5, 6 and 7, six brushes could be provided instead of four, or any other number, FIGS. 5, 6, and 7 show a schematic view of the brush layout of the machine.

In FIG. 5 six branches are shown with their axes supported on in lines that converge toward each other and upward.

FIG. 6 shows a machine with six brushes with their axes supported on two vertical lines.

FIG. 7 shows the brushes inclined forward and angled approximately 45° and all driven by belts or chains.

In the embodiment of FIG. 5, brush 115 is supported on one side of the frame, brush 116 is supported on the other. Motor 117 drives the brush 115 and the belt 118 drives the brushes 119 and 120 as well as brushes 121 and 122.

In the embodiment of the invention shown in FIG. 6, brushes 215 and 216 are supported in the same manner as the other brushes. Brushes 219 and 220 are likewise supported on central shafts and driven by the belt 118. Brushes 241 and 242 are likewise supported on suitable bearings as are the brushes in the other embodiments of the invention.

The brushes may be inclined to the horizontal as shown in FIG. 7 to give the desired angle of attack.

As shown in FIG. 6, the brushes rotate downward and inward into the vines. The shoot positioner actually does less damage than hand labor.

The unit is hydraulically adjustable vertically and horizontally. Brushes are easily adjusted for use on all trellis styles, even umbrella vines.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A brushing machine for grapevines 10 supported on a trellis comprising a brushing arrangement 11 adapted to be mounted on a general purpose farm tractor 12 adapted to move along one side of said grape trellis,
   a vertical column adapted to be supported on said tractor,
   said brushing arrangement comprising a mounting frame supported on said vertical column 13 and means to adjust said mounting frame up and down on said mounting frame,
   a brush carrier frame 14 laterally slidable on said mounting frame at a side of said tractor above the level of said grape trellis for adjusting the position of brushes on said frame relative to said tractor,
   brush support means 24 hinged to said brush carrier frame 14 by hinges to swing about a laterally extending axis 38,
   a first circular brush 15 rotatable about a first axis supported on a first side of said brush carrier frame and a second circular brush 16 rotatable about a second axis and supported on a second side of said brush carrier frame, whereby said brushes are disposed at opposite sides of said grape trellis and said circular brushes 15 and 16 are supported on said frames in horizontal spaced relation to each other with a space between said circular brushes adapted to receive said grape trellis 19 for simultaneously brushing both sides of said trellis,
   said brushes having radially extending straws terminating in tips, and
   means to swing said brush support means on said hinges about said laterally extending axis,
   motors 17, 18 connected to each said brush rotating said brushes in a manner to result in a resultant movement of the brush tips relative to the plants in a generally vertical plane as said tractor moves along said trellis.

2. The brushing machine recited in claim 1 wherein said brush carrier frame 14 has a horizontal cylinder 23 connected thereto and to said vertical column for moving said brush carrier frame laterally relative to said tractor.

3. The brushing machine recited in claim 1 wherein said motors have shafts 24, 25 that extend downward and forwardly at an angle of approximately 45° to the horizontal and said circular brushes are attached to said motor shafts whereby the speed of brush rotation in combination with the angle of adjustment of the brushes to the vertical as it relates to the forward travel of the tractor results in a vertical movement of brushes relative to the vines.

4. The brushing machine recited in claim 3 wherein said circular brushes are each made of a first plate 27 and a second plate 28 with an end of said straws sandwiched therebetween and bolts 29 extending through said plates clamping said straws between said plates.

5. The brushing machine recited in claim 4 wherein a third circular brush 31 and a fourth circular brush 32 are supported on said frame and means on such frame drives said third circular brush and said fourth circular brush.

6. The brushing machine recited in claim 5 wherein said means to drive said third circular brush 31 and fourth circular brush 32 comprises a first sprocket 33 on said first motor shaft and a second sprocket 34 on said second motor shaft,
   a first chain on said first sprocket engages means connected to said third circular brush,
   a second chain on said second sprocket connected to said fourth circular brush.

7. The brushing machine recited in claim 6 wherein said first chain is connected to said third circular brush by means of a third sprocket and said second chain is connected to said fourth circular brush by means of a fourth sprocket.

8. The brushing machine recited in claim 7 wherein a fifth circular brush and a sixth circular brush are supported on said frame and drive means on said machine connected to said third brushes.

9. The brushing machine recited in claim 8 wherein said motors are hydraulic motors.

10. The brushing machine recited in claim 9 wherein drive means comprises fifth and sixth sprockets connected to said third and fourth sprockets.

11. The brushing machine recited in claim 10 wherein said fifth and sixth sprockets are driven by said first and second motors respectively.

12. The brushing machine recited in claim 11 wherein said mounting frame vertical column is non-circular in cross section and said vertical column is slidably received in the frame member that is complementary in cross section to said vertical columns.

13. The machine recited in claim 12 wherein said machine has means to adjust the forward speed of the tractor, speed of rotation of said brushes and angle of incline of the axes of said brushes to speeds such that the relative movement of said brushes relative to said plants is in a vertical path.

* * * * *